United States Patent [19]

Heinemann et al.

[11] Patent Number: 4,466,750

[45] Date of Patent: Aug. 21, 1984

[54] BEARING SEGMENT FOR A SLIDING SHOE

[75] Inventors: Otto Heinemann, Ennigerloh; Burkhard Heiringhoff, Oelde; Helmut Lücke, Beckum; Werner Schössler, Ahlen; Helmut Krumme, Wadersloh, all of Fed. Rep. of Germany

[73] Assignee: Krupp Polysius AG, Beckum, Fed. Rep. of Germany

[21] Appl. No.: 387,441

[22] Filed: Jun. 11, 1982

[30] Foreign Application Priority Data

Jul. 23, 1981 [DE] Fed. Rep. of Germany ....... 3129066

[51] Int. Cl.³ .............................................. F16C 32/06
[52] U.S. Cl. ..................................... 384/117; 384/206
[58] Field of Search ............... 384/116, 117, 118, 111, 384/206, 309, 312

[56] References Cited

U.S. PATENT DOCUMENTS 3,464,747  9/1969  Schmidt ............................... 384/206
3,572,856  5/1971  McHugh .............................. 384/309

Primary Examiner—Lenard A. Footland
Attorney, Agent, or Firm—Learman & McCulloch

[57] ABSTRACT

A bearing segment for a tiltable and rotatable sliding shoe comprises a base on which is supported a bearing pin having a radial ball and socket joint coupling the pin to the shoe. The ball and socket joint has an inner ring supported on the pin and an outer ring fixed to the shoe. The rings have confronting arcuate surfaces which permit limited relative spherical movement of the rings.

8 Claims, 4 Drawing Figures

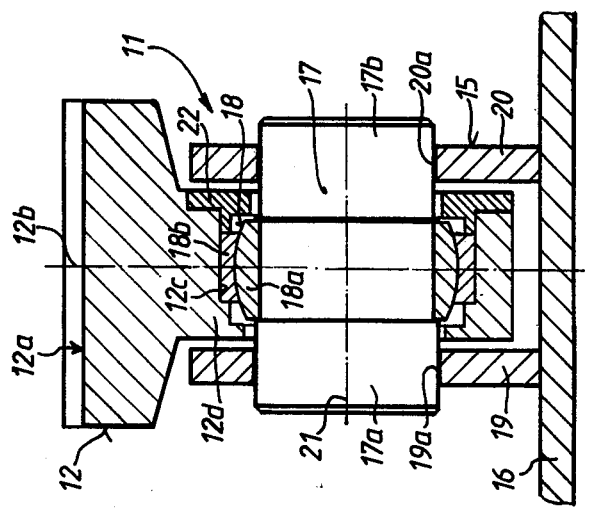
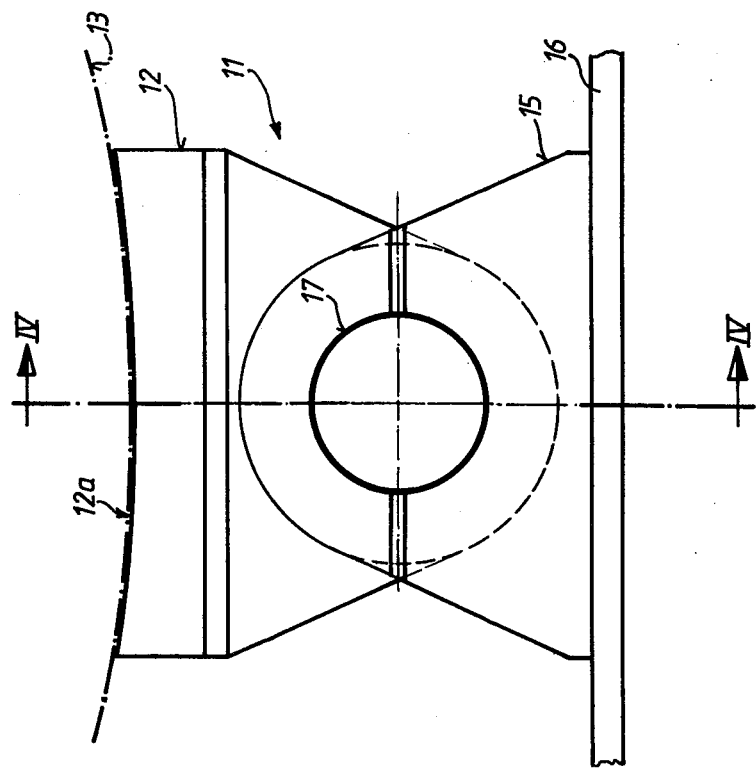

BEARING SEGMENT FOR A SLIDING SHOE

BACKGROUND OF THE INVENTION

The invention relates to a bearing segment for a sliding shoe which is supported on a bearing base so as to be tiltably and rotatably movable.

Bearing segments of this type are increasingly used for anti-friction mounting of relatively large rotating machines or machine parts, e.g., large drums of tube mills, rotary driers and similar rotating machine parts, in which the shoe of the bearing segment cooperates either directly with the peripheral outer side of the device or machine or with a ball race which may be fixed on the outer periphery of a drum.

Thus, the actual mounting can be achieved both in the radial direction and in the axial direction with the aid of the bearing segment. Particularly in the case of drums or similar large diameter machine parts which are less accurately machined it is difficult to avoid wobbling of the periphery of the drum or of the ball race mounted thereon, and therefore the anti-friction shoe of a bearing segment must be capable of following the tumbling motion in order to be able to ensure bearing support over the whole surface for the purpose of both radial and axial guiding. For this reason the anti-friction shoe of a bearing segment must be supported on the relevant bearing base so as to be tiltably and rotatably movable and generally capable of tumbling motion.

Practical experience has given rise to various constructions in which the tilting and rotating movement of the anti-friction shoe is achieved by means of a corresponding support using axial ball and socket joints, ball bearings, pressure-driven spherical pistons, or the like. If one considers first of all the purely mechanical support by ball bearings, this construction requires a ball bearing of appropriate size with corresponding recesses in the form of spherical segments. Further disadvantages of support by means of ball bearings are the unfavorable friction and the support at individual points. The other types of support referred to are even more costly in terms of expenditure and construction and are particularly disadvantageous in the case of anti-friction shoes for the purpose of axial guiding. For axial guiding purposes the shoe is generally iin sliding engagement with the sides of an annular groove cut from the peripheral outer side into the rotating machine part or with the outer sides of an attached ring or ball race.

The object of the invention, therefore, is to provide a bearing segment of the type referred to and which is distinguished over the known constructions by its structurally small, simple, and cost-saving construction.

SUMMARY OF THE INVENTION

The object of the invention is achieved by the provision of a bearing base which contains a radial ball and socket joint the inner bearing element of which is arranged on a stationary bearing pin and the outer element of which supports the anti-friction shoe.

In a bearing segment formed according to the invention the stationary bearing pin and the radial ball and socket joint serve for the tilting and rotating support of the shoe on the bearing base. Whereas an axial ball and socket joint as used in known constructions requires sliding surfaces made from particularly high-grade material (including hard chromium), for radial ball and socket joints steel sliding surfaces can for example be sufficient. In addition, this radial ball and socket joint can be used in a commercially available form, and, since the bearing pin is a part which is relatively easy to produce, the construction of the bearing segment according to the invention is particularly simple and economic as, structurally speaking, it can be kept relatively small because of the coordination of the individual parts and elements. This is particularly advantageous in the construction as an axial anti-friction bearing, but is also useful in the construction of a radial anti-friction bearing.

If the construction according to the invention is again compared with known segment constructions, it will also be seen that the construction of the bearing segment according to the invention dispenses with the costly bearing supports requiring numerous welded joints and machining which were previously used.

DESCRIPTION OF THE DRAWINGS

Further details of the invention will become apparent from the following description of two embodiments which are illustrated in the accompanying drawings, in which:

FIG. 3 is a side elevational view of a second embodiment of the bearing segment in which the shoe is intended for radial anti-friction mounting of a rotating machine part; and FIG. 4 is a sectional view along the line IV—IV in FIG. 3.

Figure 1:
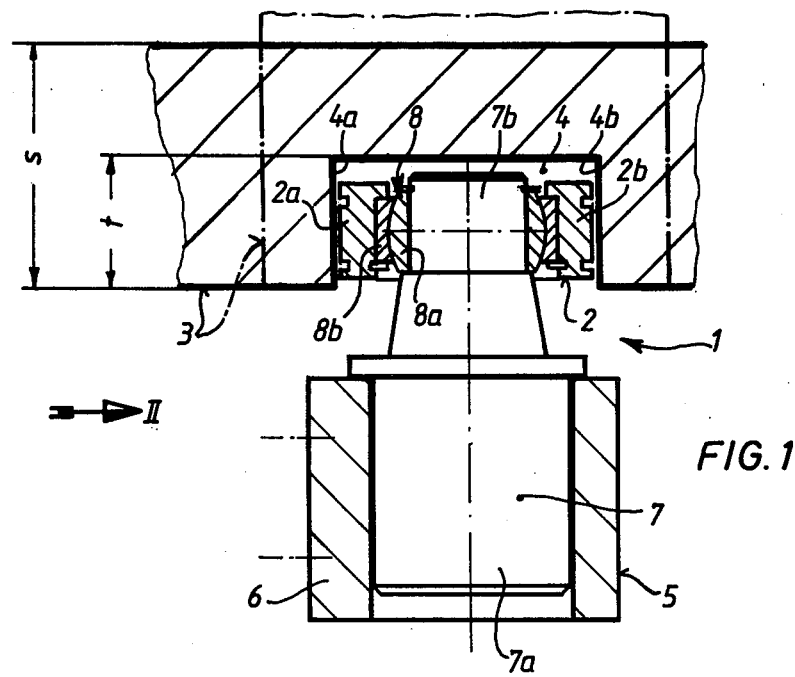
FIG. 1 is a fragmentary, sectional view of a first embodiment of the bearing segment for axial anti-friction mounting of a rotating machine part (with engagement of the shoe in an annular groove in the machine part)
Figure 2:
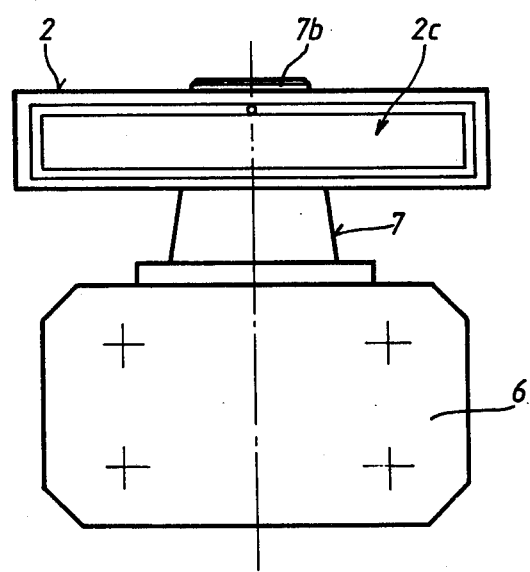
FIG. 2 is a side elevational view in the direction of the arrow II in FIG. 1 of the bearing segment only.

In the embodiment of FIGS. 1 and 2 the bearing segment 1 has an anti-friction shoe 2 which is intended for axial anti-friction mounting of a relatively large rotating machine part 3 which is indicated fragmentarily in the drawing. An annular groove 4 is machined from the outer peripheral side into this machine part 3 and the shoe 2 engages in this groove in the manner shown in FIG. 1 in order to ensure the said axial anti-friction mounting of the machine part 3.

In relation to the size of the annular groove 4 in the machine part 3 it should be mentioned that a relatively small cross-section for this groove is aimed at and above all the depth of the groove 2 should be kept small so that the wall thickness s in the groove region of the machine part 3 can be kept as small as possible, that is to say, that a specific size in the ratio of groove depth to wall thickness, i.e., t:s, should not be exceeded.

The machine part 3 can for example be the cylinder wall (indicated by solid lines) of a drum of a large diameter or a ball race mounted on the drum or a corresponding ball race rim (indicated by chain-dotted lines).

The construction of the tiltable and rotatable bearing segment 1 for the shoe 2 is of particular significance. It includes a bearing base 5 having a mounting plate 6 which can be screwed or otherwise fixed on a stationary foundation or the like. One end 7a only of a bearing pin 7 is supported in this bearing base 5 so as to be stationary and fixed against rotation while the other end 7b of the bearing pin, which can be kept somewhat smaller in diameter and projects freely in the direction of the machine part 3 or the annular groove 4, bears a radial ball and socket joint 8 and the anti-friction shoe 2.

The radial ball and socket joint 8 can be a conventional commercially available radial ball and socket joint. This radial ball and socket joint 8 has an inner ring 8a fixed on the stationary bearing pin 7 and an outer ring 8b firmly connected to the anit-friction shoe 2. As is known per se, the rings 8a and 8b of the radial ball and socket joint 8 have confronting arcuate surfaces enabling limited relative spherical movement of the rings so that the anti-friction shoe 2 is supported on the bearing base 5 via this radial ball and socket joint 8 by tilting and rotating (tumbling) over the bearing pin 7.

The bearing base 5 is stationary relative to the rotating machine part 3 so that the projecting free end 7b of the bearing pin 7 engages sufficiently deep in the annular groove 4 that its axial side walls 4a, 4b can come into sliding engagement with the anti-friction shoe 2. The shoe 2 is preferably constructed as a double shoe, that is to say, it has two shoes elements, 2a, 2b on opposite sides of similar construction which can be brought into sliding engagement with the corresponding side walls 4a and 4b of the annular groove (in both opposing axial directions of the annular groove 4).

The anti-friction shoe 2 or the anti-friction shoe elements 2a, 2a can generally be constructed in any manner suitable for an anti-friction mounting. However, it is particularly advantageous to construct each of the shoe elements 2a, 2b in the form of a hydrostatically acting bearing shoe with a supporting surface 2c enclosed by a continuous groove which is supplied with oil under pressure in a conventional way (not shown) and forms the actual anti-friction bearing surface of the shoe 2 relative to the side walls 4a, 4b of the annular groove 4.

FIG. 1 in particular shows that the depth t of the annular groove 4 can be kept relatively small because of the construction of the bearing segment 1 so that the ratio t:s referred to above can also be relatively small, i.e., the annular or guide groove 4 can be of relatively flat construction without this restricting the desired axial guiding of the machine part 3 or the structural stability.

In the second embodiment shown in FIGS. 3 and 4, the bearing segment 11 and its anti-friction shoe 12 are so constructed that this shoe 12 is intended as a radial supporting and guiding element for a relatively large rotating machine part 13 which is indicated by a chain-dotted line. As in the preceding embodiment this machine part can preferably be a corresponding outer peripheral section of a drum or the outer peripheral side of a ball race mounted on the outer side of the drum. In addition in this case the shoe 12 is preferably constructed in the form of a hydrostatically acting bearing shoe in which the supporting surface 12a which cooperates with the outer peripheral bearing surface of the machine part 13 is adapted to the external diameter of the machine part 13 and is supplied with oil under pressure in the conventional manner.

The anti-friction shoe 12 is supported so as to be tiltable and rotatable on a bearing base 15 which is arranged by means of its base and mounting plate 16 so as to be stationary on a foundation, a frame or the like. The connection between the shoe 12 and the bearing base 15 is also produced in this embodiment by a bearing or king pin 17 with a radial ball and socket joint 18 arranged thereon.

In contrast to the first embodiment, the bearing or king pin 17 is supported at both its axial ends 17a, 17b so as to be stationary in the bearing base 15, namely, in bores 19a, 20a of two continuous eye-shaped bearing base bars 19 and 20 respectively of the bearing base 15. The king pin 17 supports the inner ball joint element, namely, the inner ring 18a, fixed against rotation on its central longitudinal section (preferably symmetrical to the vertical central axis 12b of the shoe 12 - cf. FIG. 4), while the outer ball joint element, namely the outer ring 18b, is received in a bore 12c in an extension 12d of the shoe 12. This shoe extension 12d extends downward between the two bearing base bars 19 and 20 which are arranged at an appropriate distance from each other and parallel to each other. Again, the rings 18a and 18b have arcuate confronting surfaces enabling limited relative spherical movement therebetween. Thus in the rest position the geometrical axis 21 of the pin 17 also forms the geometrical axis of the shoe bore 12c and in the rest or normal position (untilted) this axis 21 extends parallel to the supporting surface 12a of the shoe and to the axis of rotation of the rotating machine part 13. The inner ring 18a of the radial ball joint 18 can be fixed on the bearing pin 17 by generally known means and, as indicated in FIG. 4, the bore 12c of the shoe 12 intended to receive the outer ring 18b of the ball joint is covered by a corresponding bearing cap 22.

Thus, a bearing segment which is extremely simple in construction, relatively small, reliable, and economical is achieved with this second embodiment. In both embodiments (FIGS. 1 to 4) it is sufficient to use a relatively simple bearing base, a very economically produced bearing pin, and a commercially available and therefore equally economical radial ball joint which in both cases ensures the desired tiltable and rotatable support of the anti-friction shoe on the bearing base by means of the spherically movable arrangement of the outer ring of the bearing.

What is claimed is:

1. A bearing segment for a rotatable and tiltable anti-friction shoe comprising a fixed base; a stationary bearing pin supported by said base; and a radial ball and socket joint coupling said pin and said shoe, said joint having an inner bearing ring supported by said pin and an outer bearing ring carried by said inner bearing ring and supporting said shoe, said inner and outer rings having confronting arcuate surfaces enabling limited relative spherical movement therebetween.

2. A bearing segment according to claim 1 wherein said pin is supported at one end only by said base.

3. A bearing segment according to claim 2 wherein said inner bearing ring is supported by said pin at its other end.

4. A bearing segment according to claim 1 wherein said shoe has anti-friction surfaces on opposite sides thereof.

5. A bearing segment according to claim 1 wherein said pin is supported at its opposite ends.

6. A bearing segment according to claim 5 wherein said inner bearing ring is supported by said pin between its ends.

7. A bearing segment according to claim 1 wherein said shoe has a hydrostatic anti-friction surface on at least one side thereof.

8. A bearing segment according to claim 1 wherein said shoe has a hydrostatic anti-friction surface on opposite sides thereof.

* * * * *